US012603194B1

(12) United States Patent
Kathol

(10) Patent No.: US 12,603,194 B1
(45) Date of Patent: Apr. 14, 2026

(54) COOLED ELECTRIC CABLE ASSEMBLY

(71) Applicant: CAES SYSTEMS LLC, Arlington, VA (US)

(72) Inventor: Bryan Kathol, Lakeside, CA (US)

(73) Assignee: CAES SYSTEMS LLC, Arlington, VA (US)

( * ) Notice: Subject to any disclaimer, the term of this patent is extended or adjusted under 35 U.S.C. 154(b) by 643 days.

(21) Appl. No.: 18/178,967

(22) Filed: Mar. 6, 2023

Related U.S. Application Data

(63) Continuation-in-part of application No. 18/151,875, filed on Jan. 9, 2023.

(51) Int. Cl.
      *H01B 7/00*        (2006.01)
      *F16L 25/01*       (2006.01)
(52) U.S. Cl.
      CPC ............ *H01B 7/0072* (2013.01); *F16L 25/01* (2013.01)
(58) Field of Classification Search
      CPC ......... H01B 7/0072; H01B 7/00; F16L 25/01; F16L 25/02
      USPC ................ 174/47, 68.1, 68.3, 8, 72 R, 74 R; 320/107, 109
      See application file for complete search history.

(56) References Cited

U.S. PATENT DOCUMENTS

| | | | | |
|---|---|---|---|---|
| 5,349,137 | A | * | 9/1994 | Cedrone ................. G02B 23/26 174/76 |
| 5,909,099 | A | * | 6/1999 | Watanabe ............ A61K 31/728 320/108 |
| 9,786,961 | B2 | * | 10/2017 | Dyer ..................... B60L 53/302 |
| 10,515,742 | B1 | * | 12/2019 | de Bock .............. H02G 3/0616 |
| 10,861,619 | B2 | * | 12/2020 | Lee .......................... B60L 50/60 |
| 11,590,855 | B2 | * | 2/2023 | Wainwright ........... B60L 58/26 |
| 11,804,315 | B2 | * | 10/2023 | Neumann ............... B60L 53/18 |
| 12,227,094 | B2 | * | 2/2025 | Mochizuki ............. H01R 13/46 |
| 2009/0256523 | A1 | | 10/2009 | Taguchi |
| 2012/0043935 | A1 | | 2/2012 | Dyer et al. |
| 2013/0029193 | A1 | | 1/2013 | Dyer et al. |
| 2015/0217654 | A1 | | 8/2015 | Woo et al. |
| 2018/0013180 | A1 | | 1/2018 | Dyer et al. |

(Continued)

FOREIGN PATENT DOCUMENTS

DE          102019114765 B3          10/2020

OTHER PUBLICATIONS

Non-Final Rejection Mailed on Sep. 17, 2025 for U.S. Appl. No. 18/151,875, 19 page(s).

(Continued)

*Primary Examiner* — Angel R Estrada

(74) *Attorney, Agent, or Firm* — Alston & Bird LLP

(57)                ABSTRACT

An electric cable assembly and a device with an electric cable assembly are provided. An example electric cable assembly includes an electric cable and a connector. The connector is configured to be in electrical communication with the electric cable and includes an interface and a rotatable member. The interface includes an electrical interface and a fluid coupling that is configured to be coupled with a fluid socket of a device or an electric component of the device. The rotatable member of the connector is configured to rotate and includes a tab that extends inward. When the fluid coupling is coupled with the fluid socket, the fluid coupling is configured to be decouplable from the fluid socket when the tab of the rotatable member is positioned outward from the fluid coupling.

20 Claims, 7 Drawing Sheets

(56) References Cited

U.S. PATENT DOCUMENTS

| 2019/0190093 A1 | 6/2019 | Dyer et al. |
| 2019/0341661 A1 | 11/2019 | Guerra et al. |
| 2022/0144112 A1 | 5/2022 | Bortolato et al. |
| 2022/0258629 A1 | 8/2022 | Hanchett et al. |

OTHER PUBLICATIONS

Notice of Allowance and Fees Due (PTOL-85) Mailed on Feb. 25, 2026 for U.S. Appl. No. 18/151,875, 9 page(s).

* cited by examiner

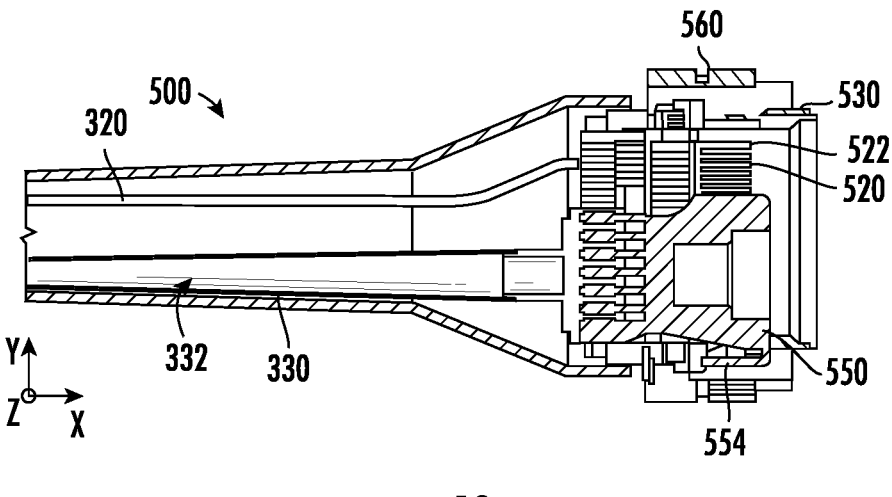
FIG. 10
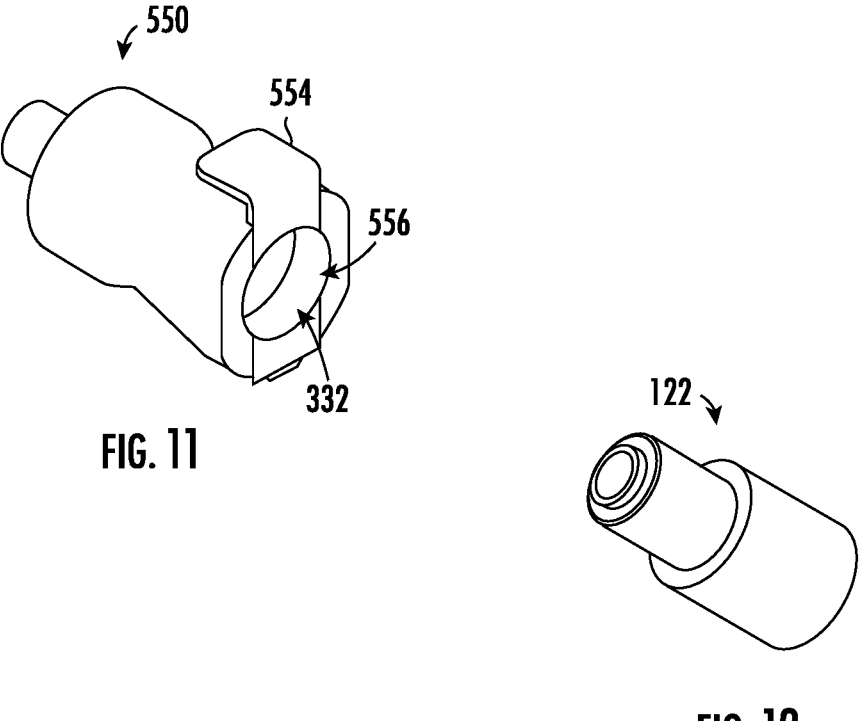
FIG. 11
FIG. 12

COOLED ELECTRIC CABLE ASSEMBLY

CROSS-REFERENCE TO RELATED APPLICATIONS

This application claims priority to and is a continuation-in-part of U.S. patent application Ser. No. 18/151,875, filed Jan. 9, 2023, the entire contents of which are incorporated by reference herein.

TECHNICAL FIELD

The present disclosure generally relates to an electric cable assembly. More specifically, the present disclosure relates to an electric cable assembly that is configured to provide electricity and a fluid to an electric component of a device to cool the electric component.

BACKGROUND

Electric cable assemblies are often used to provide electricity to an electric component. It is often desirable to provide a large amount of electric current to the electric component. However, providing a large amount of electric current to the electric component via the electric cable assembly can generate an undesirable amount of heat in the electric cable assembly and in the electric component. Therefore, it would be beneficial to cool the electric cable assembly and the electric component when the electric cable assembly is providing the large amount of electric current to the electric component. Through applied effort, ingenuity, and innovation, many identified deficiencies and problems of existing technologies have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved electric cable assemblies, fluid and electric systems, and devices that include the improved fluid and electric systems.

In various aspects, an electric cable assembly includes an electric cable and a connector. The connector can define a longitudinal axis, a circumferential direction that extends around the longitudinal axis, and a radial direction that extends from the longitudinal axis. The connector can be configured to be in electrical communication with the electric cable and can include an interface and a rotatable member. The interface can include an electrical interface and a fluid coupling that is configured to be coupled with a fluid socket of a device or an electric component of the device. The rotatable member of the connector can be configured to rotate in the circumferential direction and can include a tab that extends inward in the radial direction. When the fluid coupling is coupled with the fluid socket, the fluid coupling can be configured to be decouplable from the fluid socket when the tab of the rotatable member is positioned outward from the fluid coupling in the radial direction.

In various examples, when the fluid coupling is removed from the fluid socket, the fluid coupling may prevent a fluid from flowing through an opening of the fluid coupling. In various examples, when the fluid coupling is coupled with the fluid socket, the fluid coupling can be configured to prevent decoupling from the fluid socket when the tab of the rotatable member is not positioned outward from the fluid coupling in the radial direction.

In various examples, the fluid coupling includes an actuating member. Also, when the tab of the rotatable member is positioned outward in the radial direction from the actuating member of the fluid coupling, the tab of the rotatable member can exert a force on the actuating member of the fluid coupling. In various examples, the rotatable member includes a plurality of tabs that each extend inward in the radial direction and are each evenly spaced apart from adjacent tabs.

In various examples, the fluid coupling is a first fluid coupling and the fluid socket is a first fluid socket. Also, the interface portion can include a second fluid coupling configured to be coupled with a second fluid socket of the device or the electric component of the device. In various examples, the tab is a first tab and the rotatable member includes a second tab that extends inward in the radial direction. In various examples, when the first tab is positioned radially outward from the first fluid coupling, the second tab is positioned radially outward from the second fluid coupling.

In various aspects, an electric cable assembly includes an electric cable and a connector. The electric cable can include a sheath, an electric line positioned within the sheath, and a fluid line positioned within the sheath. The connector can define a longitudinal axis, a circumferential direction that extends around the longitudinal axis, and a radial direction that extends from the longitudinal axis. The connector can be configured to be in electrical communication with the electric cable and can include an interface and a rotatable member. The interface can include an electrical interface and a fluid coupling. The electrical interface can be configured to be in electrical communication with the electric line of the electric cable. The fluid coupling can be configured to be coupled with a fluid socket of a device or an electric component of the device. The rotatable member of the connector can be configured to rotate in the circumferential direction and can include a tab that extends inward in the radial direction. When the fluid coupling is coupled with the fluid socket, the fluid coupling can be configured to be decouplable from the fluid socket when the tab of the rotatable member is positioned outward from the fluid coupling in the radial direction.

In various examples, when the fluid coupling is removed from the fluid socket, the fluid coupling may prevent a fluid from flowing through an opening of the fluid coupling. In various examples, when the fluid coupling is coupled with the fluid socket, the fluid coupling can be configured to prevent decoupling from the fluid socket when the tab of the rotatable member is not positioned outward from the fluid coupling in the radial direction.

In various examples, the fluid coupling includes an actuating member. Also, when the tab of the rotatable member is positioned outward in the radial direction from the actuating member of the fluid coupling, the tab of the rotatable member can exert a force on the actuating member of the fluid coupling. In various examples, the rotatable member includes a plurality of tabs that each extend inward in the radial direction and are each evenly spaced apart from adjacent tabs.

In various examples, the fluid coupling is a first fluid coupling and the fluid socket is a first fluid socket. Also, the interface portion can include a second fluid coupling configured to be coupled with a second fluid socket of the device or the electric component of the device. In various examples, the tab is a first tab and the rotatable member includes a second tab that extends inward in the radial direction. In various examples, when the first tab is positioned radially outward from the first fluid coupling, the second tab is positioned radially outward from the second fluid coupling.

In various aspects, a device includes a fluid and electric system. The fluid and electric system can include a fluid source, an electric source, an electric component, and an electric cable assembly. The electric cable assembly can include an electric cable and a connector. The electric cable can include a sheath, an electric line positioned within the sheath and configured to be in electrical communication with the electric source, and a fluid line positioned within the sheath and configured to be in fluid communication with the fluid source. The connector can define a longitudinal axis, a circumferential direction that extends around the longitudinal axis, and a radial direction that extends from the longitudinal axis. The connector can be configured to be in electrical communication with the electric line of the electric cable and can include an interface and a rotatable member. The interface can include an electrical interface and a fluid coupling. The electrical interface can be configured to be in electrical communication with the electric line of the electric cable. The fluid coupling can be configured to be coupled with a fluid socket of a device or an electric component of the device. The rotatable member of the connector can be configured to rotate in the circumferential direction and can include a tab that extends inward in the radial direction. When the fluid coupling is coupled with the fluid socket, the fluid coupling can be configured to be decouplable from the fluid socket when the tab of the rotatable member is positioned outward from the fluid coupling in the radial direction.

In various examples, the fluid and electric system of the device includes a return fluid line that is in fluid communication with the electric component and the fluid source. The fluid source, the fluid line, the electric component, and the return fluid line can define, at least partially, a fluid circuit. The device can include a heat exchanger that is configured to cool a fluid within the return fluid line.

In various examples, the fluid source is configured to store a fluid or provide the fluid to the electric component. The fluid source can be a hydraulics system.

In various examples, when the fluid coupling is removed from the fluid socket, the fluid coupling prevents a fluid from flowing through an opening of the fluid coupling.

In various examples, the rotatable member includes a plurality of tabs that each extend inward in the radial direction and are each evenly spaced apart from adjacent tabs.

In various examples, the fluid coupling is a first fluid coupling and the fluid socket is a first fluid socket. Also, the interface portion can include a second fluid coupling configured to be coupled with a second fluid socket of the electric component of the device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
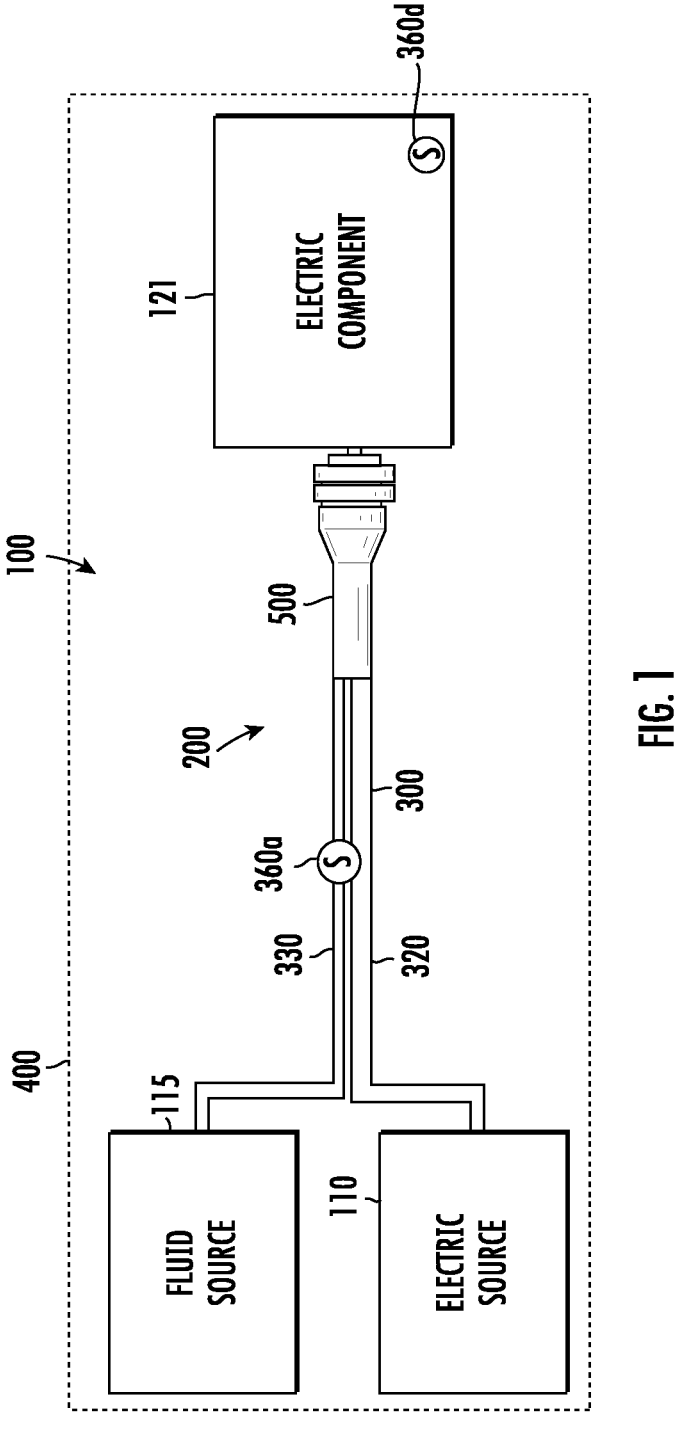

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a schematic view of a device, in accordance with an example embodiment.

Figure 2:
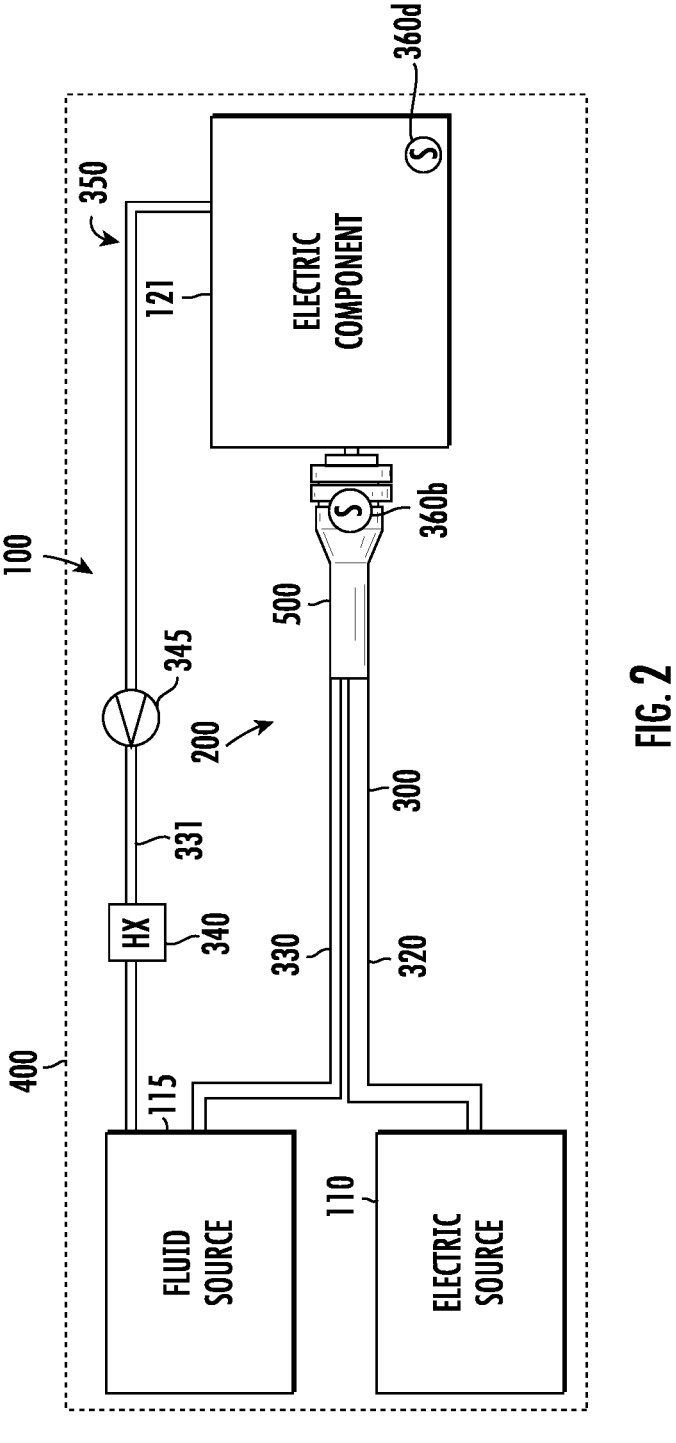

FIG. 2 provides a schematic view of a device, in accordance with an example embodiment.

Figure 3:
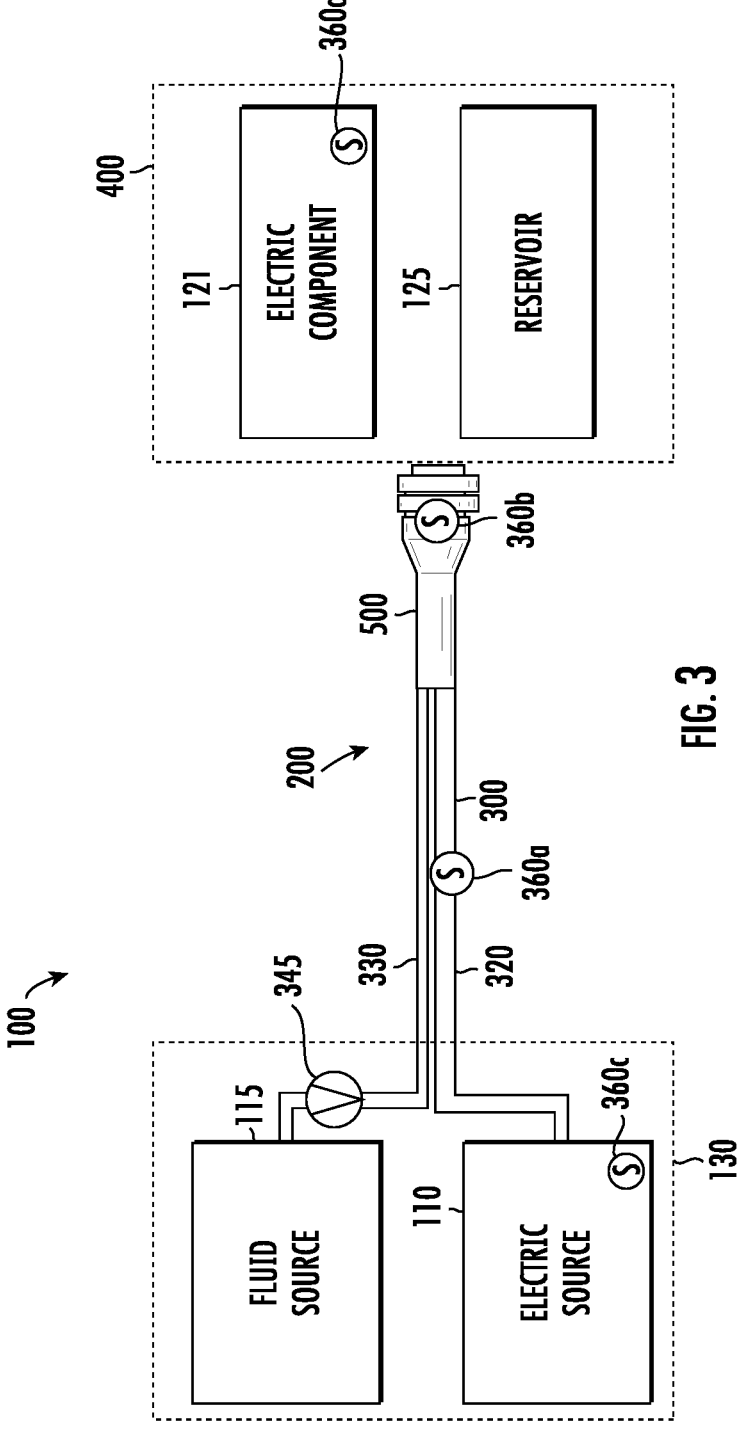

FIG. 3 provides a schematic view of a fluid and electric system, in accordance with an example embodiment.

Figure 4:
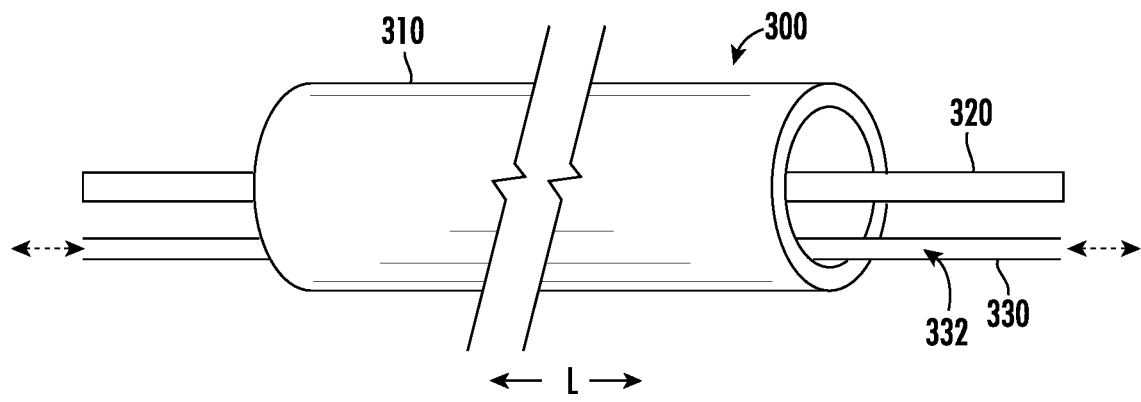

FIG. 4 provides a schematic view of an electric cable, in accordance with an example embodiment.

Figure 5:
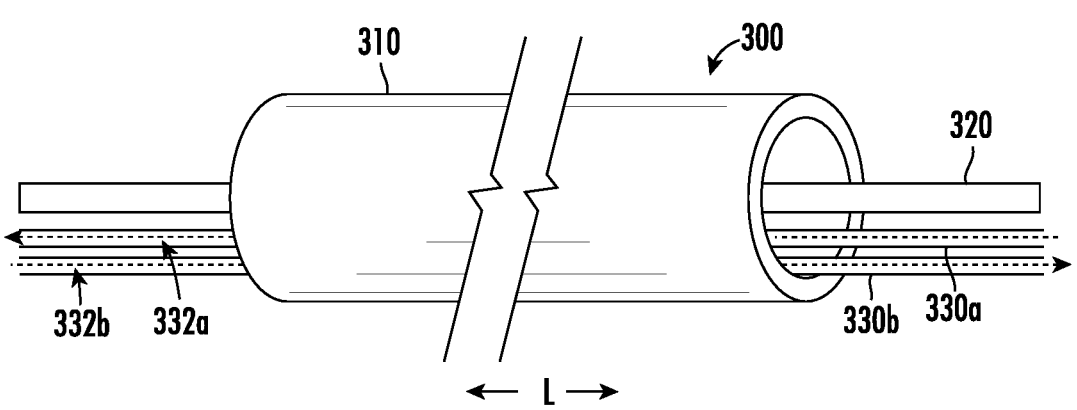

FIG. 5 provides a schematic view of an electric cable, in accordance with an example embodiment.

Figure 6:
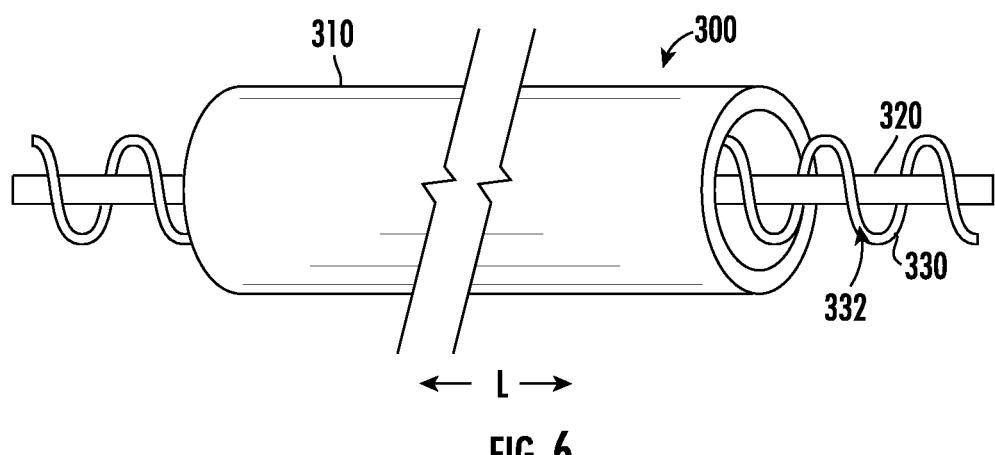

FIG. 6 provides a schematic view of an electric cable, in accordance with an example embodiment.

Figure 7:
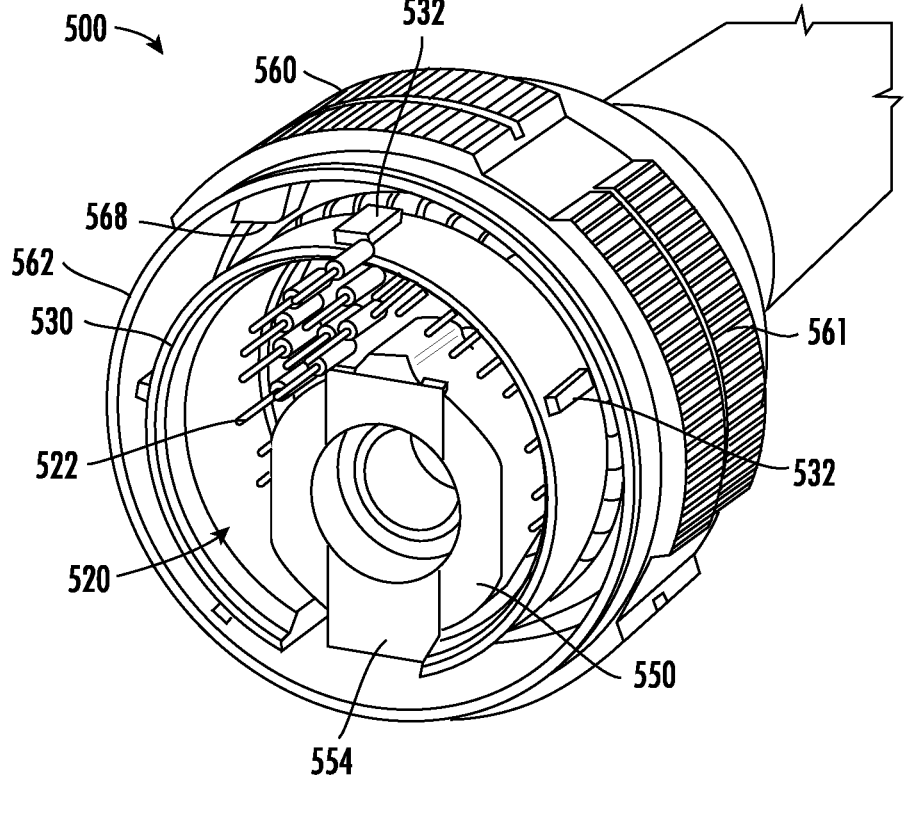

FIG. 7 provides a perspective view of a connector, in accordance with an example embodiment.

Figure 8:
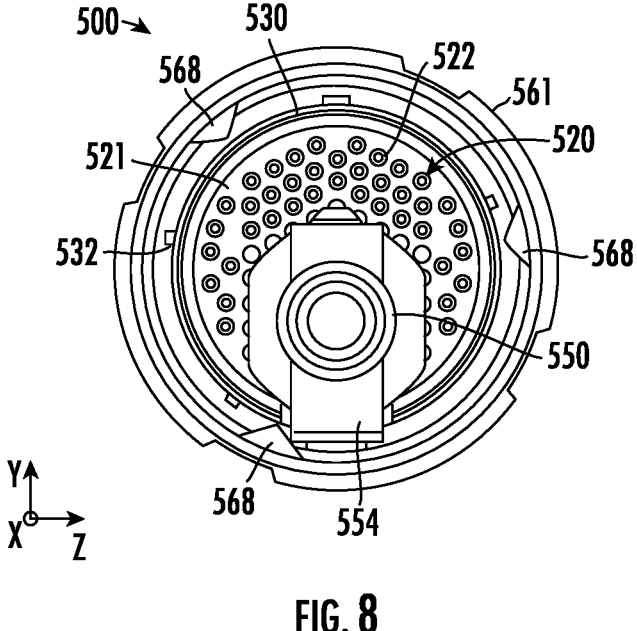

FIG. 8 provides a front view of the connector of FIG. 7, in accordance with an example embodiment.

Figure 9:
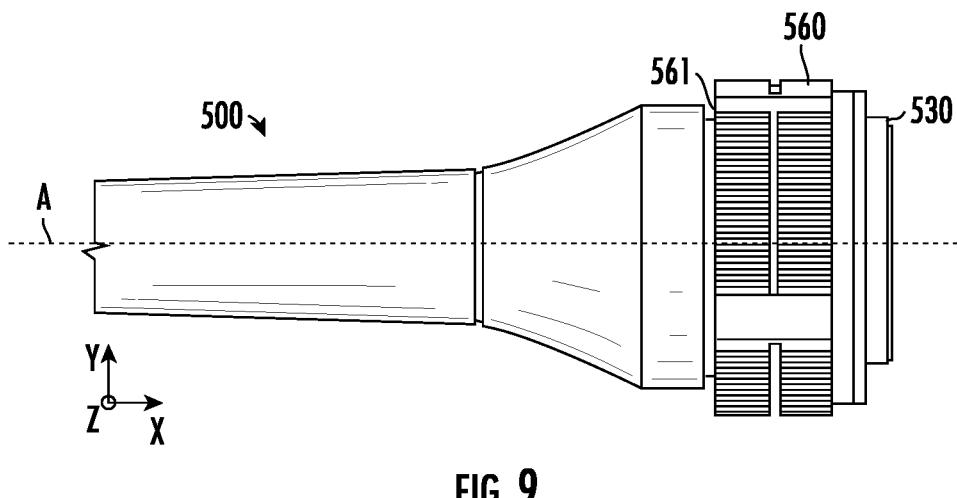

FIG. 9 provides a side view of the connector of FIG. 7, in accordance with an example embodiment.

FIG. 10 provides a cross-sectional, side view of the connector of FIG. 7, in accordance with an example embodiment.

FIG. 11 provides a perspective view of a fluid coupling of the connector of FIG. 7, in accordance with an example embodiment.

FIG. 12 provides a perspective view of a fluid socket, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure satisfies applicable legal requirements.

As used herein, the term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "fluid" may be a gas or a liquid. The term "fluid communication" means that a fluid is capable of making the connection between the areas specified.

As used herein, the term "electric communication" means that an electric current is capable of making the connection between the areas specified.

As used herein, the terms "coupled," "fixed," "attached to," and the like refer to both direct coupling, fixing, or attaching, as well as indirect coupling, fixing, or attaching through one or more intermediate components or features, unless otherwise specified herein.

Referring now to FIG. 1, a schematic view of a device 400 is provided, in accordance with an example embodiment. The device 400 can include a fluid and electric system 100 that includes an electric source 110, a fluid source 115, an electric component 121, and an electric cable assembly 200. The device 400 can be any device, machine, or system that consumes electric power. In various examples, the device 400 is an aircraft. For example, the device 400 can be an airplane, a rotorcraft, or an unmanned aerial vehicle (UAV). In various examples, the device 400 is a land vehicle. For example, the device 400 can be an automobile, such as a car. In various examples, the device 400 is a watercraft. For example, the device 400 can be a ship or a boat. In various examples, the device 400 is a spacecraft. For example, the device 400 can be a satellite or a space shuttle. In various examples, the device 400 is a machine for a vehicle, such as a gas turbine engine. In yet other examples, the device 400 is a welding machine.

The electric source 110 of the device 400 can be any component, device, module, machine, or system that stores or generates electric power. For example, the electric source 110 can be a battery that is configured to store electric power. In various other examples, the electric source 110 can be an auxiliary power unit (APU), an electric generator, or an electrochemical cell, such as a fuel cell, that is configured to generate electric power. As will be discussed further, the electric source 110 can be in electrical communication with one or more electric components 121 to provide electric power to the one or more electric components 121.

The fluid source 115 of the device 400 can be any device or system that is configured to store or provide a fluid. For example, the fluid source 115 can be a hydraulics system, a fuel system, a coolant system, a lubrication system, a sump, a reservoir, a tank, etc. As will be discussed further, the fluid source 115 can be in fluid communication with one or more electric components 121 to provide a fluid to the one or more electric components 121 to reduce a temperature of the one or more electric components 121 (i.e., cool the one or more electric components 121) and/or the cable 200.

The fluid that is stored or provided by the fluid source 115 of the device 400 can be a liquid. In various examples, the fluid can be an oil, such as a synthetic oil (e.g., polyalphaolefin (PAO)). In various examples, the fluid can be water. In various examples, the fluid can be or include a liquid dielectric (e.g., purified water, silicone oil, perfluoro, or hydrofluoroether). In various examples, the fluid can be a fuel.

The electric component 121 of the device 400 can be any component, device, module, machine, or system that stores or consumes electric power. For example, the electric component 121 can be a battery that is configured to store electric power. In various other examples, the electric component 121 can be an electric motor, an electric actuator, an electronic module, or an electronic system. In various examples, the electric component 121 can be a radar system, such as an active electronically scanned array (AESA) radar, an array electronic module (AEM), an auxiliary power unit, a navigation system, or a control system, such as a flight control system, etc.

As will be discussed further, the cable assembly 200 can be configured to transfer electric power and can include an electric cable 300 and a connector 500. A fluid pathway 332 (FIGS. 3-5), at least partially defined by a fluid line 330, can extend from the fluid source 115, through the cable assembly 200, and to or through the electric component 121 of the device 400 to cool the cable assembly 200, the electric component 121, and/or the device 400. For example, the fluid pathway 332 can be configured for movement of fluid within the fluid pathway 332 to absorb heat from and cool the electric component 121, the electric components of the cable 300 (e.g., an electric line 320 (FIGS. 4-6) of the cable assembly 200), and/or electric components of the connector 500 (e.g., electrical interfaces 522 (FIG. 7)) of the cable assembly 200.

Referring now to FIG. 2, a schematic view of a device 400 is provided, in accordance with an example embodiment. The device 400 of FIG. 2 can be the same as, or similar to, the device 400 of FIG. 1. However, in this example, the device 400 includes a return fluid line 331 that is in fluid communication with the electric component 121 and the fluid source 115. The return fluid line 331 can be configured to return the fluid that is received by the electric component 121 to the fluid source 115. In this way, the fluid source 115, the fluid line 330, the electric component 121, and the return fluid line 331 can collectively define, at least partially, a fluid circuit 350. In various examples, the fluid circuit 350 can pass through a heat exchanger 340 of the device 400. The heat exchanger 340 can be configured to cool the fluid within the fluid circuit 350 with a second fluid. For example, the heat exchanger 340 can be configured to cool the fluid within the fluid circuit 350 with air, such as ambient air, or fuel.

Referring now to FIG. 3, a schematic view of a fluid and electric system 100 is provided, in accordance with an example embodiment. The fluid and electric system 100 of FIG. 3 is similar to the fluid and electric system 100 of FIG. 1. However, in this example, the electric source 110, the fluid source 115, and the electric cable assembly 200 are exterior to the device 400. For example, the fluid and electric system 100 can include an external station 130 that is configured to provide electric power from the electric source 110 and a fluid from the fluid source 115 to the device 400 through the cable assembly 200. The external station 130 can be a charging station or an external power unit, such as a ground power unit (GPU).

In various examples, the device 400 can include a reservoir 125. The reservoir 125 can be in fluid communication with the fluid source 115 when the connector 500 is mechanically attached to the device 400. For example, when the connector 500 is mechanically coupled to the device 400, a fluid pathway 332 (FIGS. 4-6) can extend from the fluid source 115, through the cable assembly 200, through the electric component 121, and to the reservoir 125 to cool the electric component 121 of the device 400 and/or the cable assembly 200. For example, the fluid pathway 332 can be configured to absorb heat from and cool one or more electric components 121 of the device 400, electric components of the cable 300 (e.g., an electric line 320 (FIGS. 4-6) of the cable 300), and/or electric components of the connector 500 (e.g., an interface 522 (FIG. 7) of the connector 500).

Even though the schematic views of FIGS. 1-3 show that the device 400 includes only one electric component 121, in various examples, the device 400 includes a plurality of electric components 121. Each of the electric components 121 can be electrically coupled, in series or in parallel, and/or fluidly coupled, in series or in parallel.

Referring now to FIG. 4, a schematic view of an electric cable 300 is provided, in accordance with an example embodiment. The electric cable 300 can define a longitudinal direction L and can include a sheath 310, an electric line 320, and a fluid line 330. As shown, the sheath 310 can circumferentially encompass the electric line 320 and the fluid line 330. The fluid line 330 can define, at least partially, a fluid pathway 332. As will be explained in more detail, the electric line 320 can be configured to be in electrical communication with the electric source 110 (FIGS. 1-3) and/or with the electric component 121 of the device 400 (FIGS. 1-3). Similarly, the fluid line 330 can be configured to be in fluid communication with the fluid source 115 (FIGS. 1-3) and/or with the electric component 121 of the device 400 (FIGS. 1-3). In various examples, the fluid line 330 can be configured to be in fluid communication with the fluid source 115 (FIGS. 1-3) and with the reservoir 125 of the device 400 (FIG. 3). In various examples, the fluid line 330 is in fluid communication with neither fluid source 115 nor reservoir 125 and the fluid is contained within the fluid line 330 of the cable 300.

A flow of the fluid that is within the fluid pathway 332 defined at least partially by the fluid line 330 of the cable 300 can be a convective flow. For example, when the electric line 320 of the cable 300 has current transmitting through the electric line 320, heat may be generated. This heat may be absorbed by the fluid that is within the fluid pathway 332 of the fluid line 330 of the cable 300, causing the fluid to circulate within the fluid pathway 332.

In various examples, the flow of the fluid that is within fluid pathway 332 defined by the fluid line 330 of the cable 300 can be caused, partially or fully, by a pump 345 (FIG. 2 and FIG. 3). The pump can be provided within the device 400. In various other examples, the pump 345 can be provided external to the device 400. For example, the pump 345 can be provided within the external station 130 (FIG. 3) that is external to the device 400. The pump 345 can be configured to provide suction and/or pressure to the fluid pathway 332 to cause the flow of the fluid that is within the fluid pathway 332.

The pump 345 can be configured to turn on when a temperature exceeds a threshold value and can be configured to turn off when a temperature is below a threshold value. The temperature can be sensed by one or more temperature sensors 360. For example, one or more temperature sensors 360a, 360b (FIGS. 1-3) can be provided within the cable assembly 200 (e.g., within the cable 300 and/or the connector 500), one or more temperature sensors 360c (FIG. 3) can be provided within the electric source 110, and/or one or more temperature sensors 360d (FIGS. 1-3) can be provided within the device 400 (e.g., within the electric component 121 of the device 400) to sense a temperature. For example, the one or more temperature sensors can be configured to sense a temperature of the fluid within the fluid pathway 332 within the electric source 110, the cable assembly 200, and/or the device 400 and/or a temperature of the ambient environment within the electric source 110, the cable assembly 200, and/or the device 400.

As shown in the example of FIG. 4, the fluid pathway 332 defined by the fluid line 330 can be bidirectional. Stated differently, the fluid within the fluid pathway 332 can be configured to flow at least in a first direction and a second direction, the first direction and the second direction extending generally along the longitudinal direction L, in opposite directions. Referring to FIG. 3, when the flow of the fluid within the fluid pathway 332 is provided by a pump, the pump 345 can be configured to cause the fluid to flow towards the reservoir 125 of the device 400 to increase the volume of fluid within the reservoir 125 of the device 400. Similarly, the pump 345 can be configured to cause the fluid to flow towards the fluid source 115 of the external station 130 to increase the volume of fluid within the fluid source 115 of the external station 130.

The direction of the flow of fluid within the fluid pathway 332 can be determined based on the temperature sensed by the one or more temperature sensors that can be provided within the cable assembly 200, within the external station 130, and/or within the device 400. For example, if it is determined that a temperature sensed by at least one of the temperature sensors within the device 400 exceeds a threshold value, the pump 345 can cause the flow of fluid within the fluid pathway 332 to flow from the device 400 to the external station 130. Similarly, if it is determined that a temperature sensed by at least one of the temperature sensors within the electric source 110 exceeds a threshold value, the pump 345 can cause the flow of fluid within the fluid pathway 332 to flow from the external station 130 to the device 400.

In various examples, the direction of the flow of fluid within the fluid pathway 332 can be determined based on a volume of fluid within the fluid source 115 of the electric source 110 and/or the reservoir 125 of the device 400. For example, if it is determined that a volume of fluid within the fluid source 115 of the electric source 110 exceeds a threshold value and/or is reaching a volume capacity (e.g., exceeds at least 95 percent of the volume capacity), the pump 345 can cause the flow of fluid within the fluid pathway 332 to flow from the electric source 110 to the device 400. Similarly, if it is determined that a volume of fluid within the reservoir 125 of the device 400 exceeds a threshold value and/or is reaching a volume capacity (e.g., exceeds at least 50, 60, 70, 80, 85, 90, or 95 percent of the volume capacity), the pump 345 can cause the flow of fluid within the fluid pathway 332 to flow from the device 400 to the external station 130. Or, similarly, if it is determined that a volume of fluid within the reservoir 125 of the device 400 is below a threshold value and/or is approaching empty (e.g., below at least 50, 40, 30, 20, 15, 10, or 5 percent of the volume capacity), the pump 345 can cause the flow of fluid within the fluid pathway 332 to flow from the external station 130 to the device 400.

Referring now to FIG. 5, a schematic view of an electric cable 300 is provided, in accordance with an example embodiment. The electric cable 300 of FIG. 5 can be configured similarly to, or the same as, the cable 300 of FIG. 4. However, in this example, the cable 300 includes a plurality of fluid lines 330 (e.g., two, three, four, or five fluid lines 330). In this example, the cable 300 includes a first fluid line 330*a* and a second fluid line 330*b*. The first fluid line 330*a* can define a first fluid pathway 332*a*. The second fluid line 330*b* can define a second fluid pathway 332*b*.

As shown in the example of FIG. 5, the first fluid pathway 332*a* defined by the first fluid line 330*a* and the second fluid pathway 332*b* defined by the second fluid line 330*b* can each be unidirectional. Also, as shown, the fluid within the first fluid pathway 332*a* can be configured to flow in a first direction and the fluid within the second fluid pathway 332*b* can be configured to flow in a second direction, the first direction and the second direction extending generally along the longitudinal direction L, in opposite directions. The flow of fluid within the first fluid pathway 332*a* and the flow of fluid within the second fluid pathway 332*b* can be provided by one or more pumps. However, in various other examples, the flow of fluid within the first fluid pathways 332*a* and the flow of fluid within the second fluid pathway 332*b* can be a convection flow.

Still referring to the example of FIG. 5, the fluid within the first fluid pathway 332*a* and the second fluid pathway 332*b* can circulate from the electric source 110, through the cable assembly 200 (e.g., through the cable 300 and the connector 500), to the electric component 121 of the device 400, and then back through the cable assembly 200 and back to the fluid source 115. Stated differently, at least the first fluid pathway 332*a* and the second fluid pathway 332*b* can define a fluid circuit, which may be a closed fluid circuit. In various examples, the first fluid pathway 332*a*, the second fluid pathway 332*b*, the fluid source 115, and, in some examples, the reservoir 125 of the device 400 define the fluid circuit, which may be a closed fluid circuit.

In various examples, each of the first fluid pathway 332*a* and the second fluid pathway 332*b* can be provided with a pump 345 and a flow rate of the fluid within the first fluid pathway 332*a* and the second fluid pathway 332*b* can be controlled separately by the pumps. However, in other examples, one or more pumps can be provided to provide a flow of fluid within the first fluid pathway 332*a* and the second fluid pathway 332*b*. The flow rate of the fluid within the first fluid pathway 332*a* and the second fluid pathway 332*b* can be determined based on cooling needs of components within the electric source 110, the cable assembly 200, the electric component 121, and/or the device 400, volume or rate of fluid flow, and/or volume of capacity of a reservoir 125. For example, if it is determined that a temperature sensed by a temperature sensor within the electric source 110, the cable assembly 200, the electric component 121, and/or the device 400 exceeds a threshold value, the flow rate of the fluid within the first fluid pathway 332*a* and/or the second fluid pathway 332*b* can be increased to provide for additional cooling and/or to refill a reservoir, such as reservoir 125.

Referring now to FIG. 6, a schematic view of an electric cable 300 is provided, in accordance with an example embodiment. The electric cable 300 can be configured similarly to, or the same as, the electric cable 300 of FIG. 4 or FIG. 5. In this example, the fluid line 330 can be generally helix-shaped or generally spiral-shaped. As shown, the fluid line 330 can wrap around the electric line 320. Wrapping the fluid line 330 around the electric line 320 may provide for additional heat transfer from the electric line 320 to the fluid flowing in the fluid pathway 332 of the fluid line 330 due to the additional surface area of the fluid line 330 at each point along the electric line 320 along the longitudinal direction L.

Referring now to FIG. 7, a perspective view of a connector 500 is provided, in accordance with an example embodiment. The connector 500 can be configured to be in electrical communication with at least one of the electric cable 300, the electric source 110, and/or the electric component 121 of the device 400 (FIGS. 1-3). The connector 500 can be mechanically coupled to, or integral with, the cable 300. The connector 500 can be selectively mechanically coupled to the device 400, as schematically depicted in FIG. 3, and/or can be selectively mechanically coupled to the electric component 121 of the device 400, as schematically depicted in FIGS. 1 and 2.

The connector 500 can include an interface portion 520. The interface portion 520 can include at least one interface 522, such as at least one interface 522 and up to sixty interfaces 522, such as at least three interfaces and up to forty interfaces, such as at least five interfaces and up to thirty interfaces. The interface portion 520 can additionally include at least one fluid coupling 550, such as at least one fluid coupling 550 and up to four fluid couplings 550, such as at least one fluid coupling 550 and up to two fluid couplings 550. However, in various other examples, the interface portion 520 can include more than four fluid couplings 550. For example, one or more fluid coupling 550 may be used for a first fluid type, while one or more fluid couplings 550 may be used for a second fluid type different than the first fluid type. In various examples, one or more fluid coupling 550 may be used to provide a fluid whereas another one or more fluid coupling 550 may be used to return a fluid. The interface portion 520 of the connector 500 can include a stationary member 530 that can include one or more keying features 532. Each keying feature 532 of the stationary member 530 of the connector 500 can be configured to mate with a corresponding keying feature (not shown) on the device 400 or the electric component 121 of the device 400, which may ensure alignment of the at least one interface 522 and the at least one fluid coupling 550 with corresponding sockets of the device 400 or the electric component 121 of the device 400.

The connector 500 can include a rotatable member 560. The rotatable member 560 can encircle the stationary member 530. The rotatable member 560 can include a textured portion 561. As depicted in the example of FIG. 7, the textured portion 561 includes striations. However, the textured portion 561 can include various other patterns. For example, the textured portion 561 can include striplings, knurling, or the like. The textured portion 561 may increase the ability of a user to grip and/or rotate the rotatable member 560 of the connector 500. Also, the textured portion 561 may increase the ability of a user to blind mate the connector 500 with a socket of the device 400 or the electric component 121 of the device 400 because the user may be able to tactically distinguish the rotatable member 560 from other components.

The rotatable member 560 can include threads (not depicted) on the inner surface of the rotatable member 560. The threads can allow the rotatable member 560 to be rotatably engageable with a socket of the device 400 or the electric component 121 of the device 400. The threads can be configured to mate with corresponding threads of a socket of the device 400 or the electric component 121 of the device 400. The threads of the rotatable member 560 can be configured to have a multi-thread configuration. For example, the rotatable member 560 can be configured to have a "double start," "triple start," or "quadruple start"

configuration. The multi-thread configuration may decrease the amount of time required to couple the rotatable member 560 to the corresponding socket of the device 400 or the electric component 121 of the device 400 in contrast to a single thread configuration because it may require less rotation.

Referring now to FIG. 8, a front view of the connector 500 of FIG. 7 is provided, in accordance with an example embodiment. As seen in this view, the interface portion 520 can define a face 521. The face 521 of the connector 500 can define an X direction (in and out of page), a Y direction that is orthogonal to the X direction, and a Z direction that is orthogonal to the X direction and the Y direction. The face 521 of the interface portion 520 can extend generally along a plane defined by the Y direction and the Z direction.

As mentioned, the interface portion 520 of the connector 500 can include at least one interface 522. As depicted in this example, each of the at least one interfaces 522 can be pin-shaped and can extend from the face 521 in the X direction. Also, each of the at least one interface 522 can be configured to be engageable with and coupled to a corresponding socket (not shown) of the device 400 or the electric component 121 of the device 400. In various examples, each interface 522 can be configured to be slidingly engageable with a corresponding socket of the device 400 or a corresponding socket of the electric component 121 of the device 400. The at least one interface 522 can include an electrical interface. Additionally, the at least one interface 522 can include a communication interface and/or a ground interface. When configured as electrical interface(s), each of the one or more interface 522 can be in electrical communication with the electric line 320 of the cable 300. For example, the interface 522 can be electrically coupled to, or electrically integral with, the electric line 320 of the cable 300.

As mentioned, the interface portion 520 of the connector 500 can include at least one fluid coupling 550. The fluid coupling 550 can be in fluid communication with the fluid line 330 of the cable 300. Also, the fluid pathway 332 can extend through the fluid line 330 of the cable 300 and through the fluid coupling 550. As will be explained further, the fluid coupling 550 can be configured to be engageable with and coupled to a fluid socket 122 (FIG. 12) of the device 400 or the electric component 121 of the device 400. Although not shown, the interface portion 520 of the connector 500 can include two or more fluid couplings 550. For example, and with reference to FIG. 5, a first fluid coupling 550 can be in fluid communication with the first fluid line 330a of the cable 300 and a second fluid coupling 550 can be in fluid communication with the second fluid line 330b of the cable 300.

The fluid coupling 550 of the connector 500 can include an actuating member 554. Also, the rotatable member 560 can include at least one tab 568. Each tab 568 of the rotatable member 560 can extend radially inward towards a longitudinal axis A (FIG. 9) that is defined by the connector 500 and extends in the X direction. In this example, the rotatable member 560 includes three tabs 568. However, in various other examples, the rotatable member 560 includes one, two, four, five, or six or more tabs 568. The number of tabs 568 may correspond to the number of threads included on the interior surface of the rotatable member 560. For example, for a single start thread configuration, the number of tabs 568 can be one; for a double start thread configuration, the number of tabs 568 can be two; for a triple start thread configuration, the number of tabs 568 can be three; for a quadruple start thread configuration, the number of tabs 568 can be four; etc. Each of the tabs 568 can be triangular shaped, as depicted in this example. However, the tabs 568 can have shapes other than triangular. For example, the tabs 568 can have an isosceles trapezium shape, a semicircle shape, a half oval shape, etc.

In various examples, when the rotatable member 560 includes a plurality of tabs 568, each of the tabs 568 can be evenly spaced apart from adjacent tabs 568. For example, when the rotatable member 560 includes two tabs 568, each of the tabs 568 can be spaced apart from adjacent tabs 568 by 180 degrees circumferentially around the longitudinal axis A, when the rotatable member 560 includes three tabs 568, each of the tabs 568 can be spaced apart from adjacent tabs 568 by 120 degrees circumferentially around the longitudinal axis A, when the rotatable member 560 includes four tabs 568, each of the tabs 568 can be spaced apart from adjacent tabs 568 by 90 degrees circumferentially around the longitudinal axis A, etc.

Additionally, when the interface portion 520 of the connector 500 includes more than one fluid coupling 550, a plurality of tabs 568 can be provided and spaced such that when one of the tabs 568 is positioned radially outward from one of the fluid couplings 550, one or more other tabs 568 are positioned outward from the other of the fluid coupling(s) 550. For example, when the interface portion 520 of the connector 500 includes two fluid couplings 550 that are spaced ninety degrees circumferentially from each other, the rotatable member 560 can include at least two tabs 568 that are spaced ninety degrees circumferentially from each other.

In various examples, the tab 568 of the rotatable member 560 can be configured to be engageable with the actuating member 554 of the fluid coupling 550. For example, the tab 568 of the rotatable member 560 can be configured to exert a pushing force on the actuating member 554 of the fluid coupling 550. When the rotatable member 560 has a multi-thread configuration, the rotatable member 560 can include more than one tab 568 to correspond with the number of threads included on the rotatable member 560. For example, when the rotatable member 560 has a double start configuration, the rotatable member 560 can include two tabs 568; when the rotatable member 560 has a triple start configuration, the rotatable member 560 can include three tabs 568; when the rotatable member 560 has a quadruple start configuration, the rotatable member 560 can include four tabs 568; etc.

Referring now to FIGS. 9 and 10, a side view (FIG. 9) and a cross-sectional, side view (FIG. 10) of the connector 500 of FIG. 7 are provided, in accordance with an example embodiment. As discussed, the connector 500 can define the longitudinal axis A that extends in the X direction. The longitudinal axis A can extend through a center point of the rotatable member 560. The connector 500 can further define a circumferential direction that extends around the longitudinal axis A and a radial direction that extends from the longitudinal axis A. As seen in FIG. 10, the connector 500 can further define the fluid pathway 332 that is at least partially defined by the fluid line 330 of the cable 300 (FIGS. 4-6).

Referring now to FIG. 11, a perspective view of the fluid coupling 550 of the connector 500 of FIG. 7 is provided, in accordance with an example embodiment. As seen in this view, the fluid coupling 550 can define an opening 556. The opening 556 of the fluid coupling 550 can further define the fluid pathway 332 that is at least partially defined by the fluid line 330 of the cable 300 (FIGS. 4-6).

Referring now to FIG. 12, a perspective view of the fluid socket 122 of the device 400 is depicted, in accordance with an example embodiment. As previously mentioned, the fluid coupling 550 (FIG. 11) can be configured to be coupled with the fluid socket 122 of the device 400 or the electric component 121 of the device 400. More specifically, the fluid coupling 550 can be configured to be slidingly engageable with and coupled to the fluid socket 122 of the device 400 or the electric component 121 of the device 400.

Referring now to FIG. 11 and FIG. 12, the fluid coupling 550 can be configured to be removably coupled with (e.g., capable of being coupled and decoupled) from the fluid socket 122 when the actuating member 554 of the fluid coupling 550 is in a first position and configured to prevent decoupling from the fluid socket 122 when the actuating member 554 is in a second position. For example, the fluid coupling 550 can be configured to be removably coupled with the fluid socket 112 of the device 400 or the electric component 121 of the device 400 when the actuating member 554 of the fluid coupling 550 is pushed inward, towards a center of the fluid coupling 550. As used herein, the word 'decouplable' or the phrase 'removably coupled', and the like, means that one object can be decoupled from another object, such as with a relatively small amount of force. For example, an object that is decouplable from or removably coupled with another object can be decoupled by the force exerted by a user's hand.

The fluid coupling 550 can be configured to prevent the fluid coupling 550 from being decoupled from the fluid socket 122 of the device 400 or the electric component 121 of the device 400 when the actuating member 554 of the fluid coupling 550 is allowed to move outwards, away from a center of the fluid coupling 550. As used herein, the phrase 'prevent decoupling', and the like, means that one object is difficult to decouple from another object. For example, an object that is prevented from decoupling with another object is difficult, or impossible, to decouple by the force exerted by a user's hand, such as pulling by hand, an accidental tripping, or the like.

In various examples, when the fluid coupling 550 prevents the fluid coupling 550 from being decoupled from the fluid socket 122 of the device 400 or the electric component 121 of the device 400, the fluid coupling 550 also prevents the connector 500 from being decoupled from the device 400 or the electric component 121 of the device 400. In contrast, when the fluid coupling 550 allows the fluid coupling 550 to be decoupled from the fluid socket 122 of the device 400 or the electric component 121 of the device 400, the fluid coupling 550 also allows the connector 500 to be decoupled from the device 400 or the electric component 121 of the device 400.

In various examples, the fluid coupling 550 can be configured as a drip-less fluid coupling 550. For example, the fluid coupling 550 can be configured to prevent fluid from entering or exiting the opening 556 of the fluid coupling 550 when the fluid coupling 550 is not coupled with the fluid socket 122. Similarly, the fluid coupling 550 can be configured to allow fluid from entering and/or exiting the opening 556 of the fluid coupling 550 when the fluid coupling 550 is coupled to the fluid socket 122.

Referring now also to FIGS. 7-10, the connector 500 can be coupled with the device 400, as depicted in FIG. 3, or with the electric component 121 of the device 400, as depicted in FIGS. 1 and 2, by pushing the connector 500 towards the sockets (e.g., fluid socket 122 of FIG. 12 and/or electrical sockets) of the device 400 or the electric component 121 of the device 400 and rotating the rotatable member 560 in the circumferential direction until one of the tabs 568 is positioned radially outward of the actuating member 554 of the fluid coupling 550. When one of the tabs 568 is positioned radially outward from the actuating member 554 of the fluid coupling 550, the fluid coupling 550 is pushed inward in the radial direction by the tab 568. Once the actuating member 554 of the fluid coupling 550 is pushed inward in the radial direction by the tab 568, the fluid coupling 550 may mechanically couple with the fluid socket 122 of the device 400 or the electric component 121 of the device 400. In various examples, the fluid coupling 550 may be configured to provide an audible and/or tactile 'click' that can be heard and/or felt by the user of the connector 500 when the fluid coupling 550 is mechanically coupled to the fluid socket 122 of the device 400 or the electric component 121 of the device 400. In various examples, when none of the tabs 568 are positioned radially outward of the actuating member 554 of the fluid coupling 550, the fluid coupling 550 pay prevent the connector 500 from being coupled with the device 400 or with the electric component 121 of the device 400. Stated differently, when each of the tabs 568 are disengaged from the actuating member 554 of the fluid coupling 550, the fluid coupling 550 pay prevent the connector 500 from being coupled with the device 400 or with the electric component 121 of the device 400.

Once coupled to the fluid socket 122 of the device 400 or the electric component 121 of the device 400, the fluid coupling 550 may lock the connector 500 to the device 400 or the electric component 121 of the device 400. For example, when none of the tabs 568 of the rotatable member 560 are positioned radially outward from the actuating member 554 of the fluid coupling 550, the fluid coupling 550 may lock the connector 500 to the device 400 or the electric component 121 of the device 400. After the fluid coupling 550 is coupled with the fluid socket 122 of the device 400 or the electric component 121 of the device 400, the fluid is allowed to flow to or from the fluid source 115, through the cable assembly 200, and to or from the electric component 121 of the device 400. Allowing the fluid to flow to or from the fluid source 115, through the cable assembly 200, and to or from the electric component 121 of the device 400 may increase the amount of heat removed from the cable assembly 200 and/or the electric component 121 of the device 400, which increases the amount of cooling of the cable assembly 200 and/or the electric component 121 of the device 400. Increasing the amount of cooling of the cable assembly 200 and/or the electric component 121 of the device may allow for the amount of current density being transferred by the cable assembly 200 and to the electric component 121 to be increased.

When it is desired to decouple the connector 500 from the device 400, a user can rotate the rotatable member 560. The rotation of the rotatable member 560 can cause the tab 568 of the rotatable member 560 to move circumferentially around the longitudinal axis A (FIG. 9) and towards the actuating member 554 of the fluid coupling 550. When one of the tabs 568 of the rotatable member 560 is positioned outward from the actuating member 554 of the fluid coupling 550 in the radial direction, a pushing force is exerted onto the actuating member 554 of the fluid coupling 550 and the actuating member 554 is pushed radially inwards, towards a center of the fluid coupling 550. Pushing the actuating member 554 inwards may unlock the fluid coupling 550 and the connector 500 from the socket of the device 400, making the fluid coupling 550 and the connector 500 decouplable from the sockets. Additionally, pushing the actuating member 554 inwards may prevent a fluid from flowing in or out of the fluid coupling 550. After the actuating member 554 is pushed inwards, the connector 500 can then be decoupled from the device 400, such as by pulling the connector 500 away from the device 400. The fluid coupling 550 may prevent a fluid from flowing in or out of the fluid coupling 550 after the connector 500 is decoupled from the electric component 121 or the device 400.

Preventing a fluid from flowing in or out of the fluid coupling 550 when the actuating member 554 of the fluid coupling 550 is moved inwards or when the fluid coupling 550 is decoupled from the fluid socket 122 has many benefits. For example, this configuration may increase the safety for the operator of the electric component 121 of the device 400 and/or the device 400. This configuration may increase the safety for the user of the connector 500 by reducing the chance of electric shock from the fluid and/or reducing the chance of burning or scalding of the skin of the user from the fluid, which can become hot. Also, this configuration may increase the user experience for a user using the connector 500 by preventing user irritation and/or anxiety caused by fluids near or on the connector 500. Additionally, this configuration may reduce the negative environmental impact of the connector 500 by preventing potentially harmful fluids from escaping the connector 500.

CONCLUSION

The above descriptions of various embodiments of the subject disclosure and corresponding figures and what is described in the Abstract, are provided and described herein for illustrative purposes and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An electric cable assembly comprising:
an electric cable; and
a connector that defines a longitudinal axis, a circumferential direction that extends around the longitudinal axis, and a radial direction that extends from the longitudinal axis, wherein the connector is configured to be in electrical communication with the electric cable, the connector comprising:
an interface portion comprising:
an electrical interface; and
a fluid coupling configured to be coupled with a fluid socket of a device or an electric component of the device; and

a rotatable member that is configured to rotate in the circumferential direction,
wherein the rotatable member comprises a tab that extends inward in the radial direction,
wherein when the fluid coupling is coupled with the fluid socket, the fluid coupling is configured to be decouplable from the fluid socket when the tab of the rotatable member is positioned outward from the fluid coupling in the radial direction.

2. The electric cable assembly of claim 1, wherein when the fluid coupling is removed from the fluid socket, the fluid coupling prevents a fluid from flowing through an opening of the fluid coupling.

3. The electric cable assembly of claim 1, wherein when the fluid coupling is coupled with the fluid socket, the fluid coupling is configured to prevent decoupling from the fluid socket when the tab of the rotatable member is not positioned outward from the fluid coupling in the radial direction.

4. The electric cable assembly of claim 1, wherein the fluid coupling comprises an actuating member, wherein when the tab of the rotatable member is positioned outward in the radial direction from the actuating member of the fluid coupling, the tab of the rotatable member exerts a force on the actuating member of the fluid coupling.

5. The electric cable assembly of claim 1, wherein the rotatable member comprises a plurality of tabs that each extend inward in the radial direction and are each evenly spaced apart from adjacent tabs.

6. The electric cable assembly of claim 1, wherein the fluid coupling is a first fluid coupling and the fluid socket is a first fluid socket, wherein the interface portion further comprises a second fluid coupling configured to be coupled with a second fluid socket of the device or the electric component of the device.

7. The electric cable assembly of claim 6, wherein the tab is a first tab and the rotatable member comprises a second tab that extends inward in the radial direction, wherein when the first tab is positioned radially outward from the first fluid coupling, the second tab is positioned radially outward from the second fluid coupling.

8. An electric cable assembly comprising:
an electric cable comprising:
a sheath;
an electric line positioned within the sheath; and
a fluid line positioned within the sheath; and
a connector that defines a longitudinal axis, a circumferential direction that extends around the longitudinal axis, and a radial direction that extends from the longitudinal axis, the connector comprising:
an interface portion comprising:
an electrical interface configured to be in electrical communication with the electric line of the electric cable; and
a fluid coupling configured to be in fluid communication with the fluid line of the electric cable, wherein the fluid coupling is configured to be coupled with a fluid socket of a device or an electric component of the device; and
a rotatable member that is configured to rotate in the circumferential direction,
wherein the rotatable member comprises a tab that extends inward in the radial direction,
wherein when the fluid coupling is coupled with the fluid socket, the fluid coupling is configured to be decouplable from the fluid socket when the tab of the rotatable member is positioned outward from the fluid coupling in the radial direction.

9. The electric cable assembly of claim 8, wherein when the fluid coupling is removed from the fluid socket, the fluid coupling prevents a fluid from flowing through an opening of the fluid coupling.

10. The electric cable assembly of claim 8, wherein the fluid coupling comprises an actuating member, wherein when the tab of the rotatable member is positioned outward in the radial direction from the actuating member of the fluid coupling, the tab of the rotatable member exerts a force on the actuating member of the fluid coupling.

11. The electric cable assembly of claim 8, wherein the rotatable member comprises a plurality of tabs that each extend inward in the radial direction and are each evenly spaced apart from adjacent tabs.

12. The electric cable assembly of claim 8, wherein the fluid coupling is a first fluid coupling and the fluid socket is a first fluid socket, wherein the interface portion further comprises a second fluid coupling configured to be coupled with a second fluid socket of the device or the electric component of the device.

13. A device comprising:

a fluid and electric system comprising:

a fluid source;

an electric source;

an electric component; and an electric cable assembly comprising:

an electric cable comprising:

a sheath;

an electric line positioned within the sheath, the electric line configured to be in electrical communication with the electric source; and a fluid line positioned within the sheath, the fluid line configured to be in fluid communication with the fluid source; and a connector that defines a longitudinal axis, a circumferential direction that extends around the longitudinal axis, and a radial direction that extends from the longitudinal axis, the connector comprising:

an interface portion comprising:

an electrical interface configured to be in electrical communication with the electric line of the electric cable; and a fluid coupling configured to be in fluid communication with the fluid line of the electric cable, wherein the fluid coupling is configured to be coupled with a fluid socket of the device or the electric component of the device; and a rotatable member that is configured to rotate in the circumferential direction, wherein the rotatable member comprises a tab that extends inward in the radial direction, wherein when the fluid coupling is coupled with the fluid socket, the fluid coupling is configured to be decouplable from the fluid socket when the tab of the rotatable member is positioned outward from the fluid coupling in the radial direction.

14. The device of claim 13, wherein the fluid and electric system further comprises a return fluid line that is in fluid communication with the electric component and the fluid source.

15. The device of claim 14, wherein the fluid source, the fluid line, the electric component, and the return fluid line define, at least partially, a fluid circuit.

16. The device of claim 14, wherein the device further comprises a heat exchanger that is configured to cool a fluid within the return fluid line.

17. The device of claim 13, wherein the fluid source is configured to store a fluid or provide the fluid to the electric component, wherein the fluid source is a hydraulics system.

18. The device of claim 13, wherein when the fluid coupling is removed from the fluid socket, the fluid coupling prevents a fluid from flowing through an opening of the fluid coupling.

19. The device of claim 13, wherein the rotatable member comprises a plurality of tabs that each extend inward in the radial direction and are each evenly spaced apart from adjacent tabs.

20. The device of claim 13, wherein the fluid coupling is a first fluid coupling and the fluid socket is a first fluid socket, wherein the interface portion further comprises a second fluid coupling configured to be coupled with a second fluid socket of the electric component of the device.

* * * * *